No. 775,701. PATENTED NOV. 22, 1904.
J. J. COSTON.
HOE.
APPLICATION FILED MAR. 30, 1904.
NO MODEL.
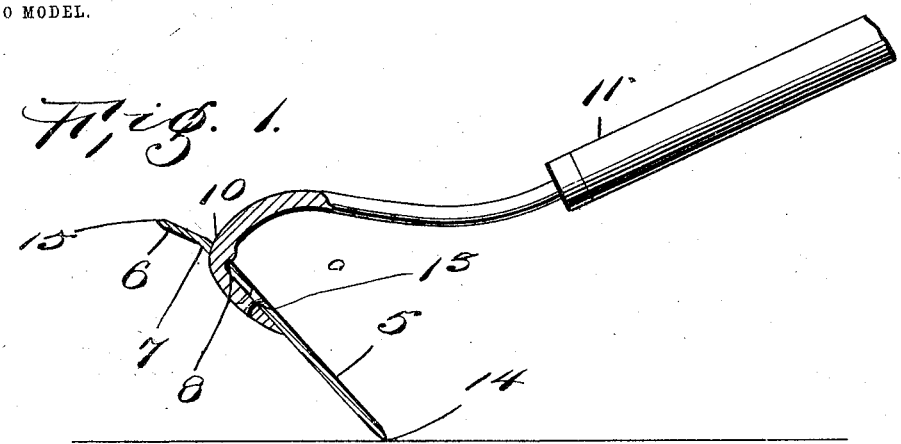
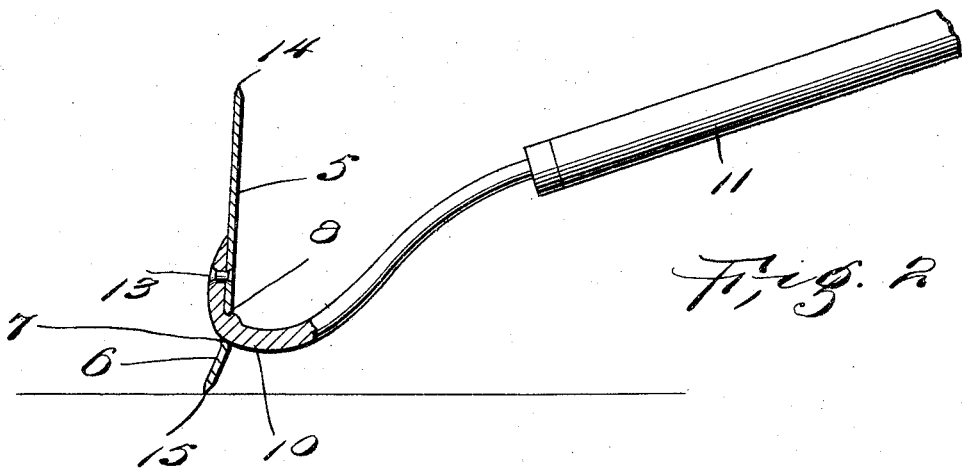
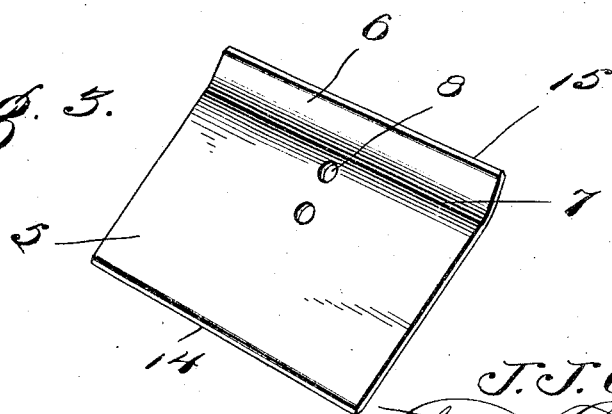
Witnesses
Inventor
J. J. Coston
Attorneys No. 775,701.  
Patented November 22, 1904.

UNITED STATES PATENT OFFICE.

JOHN JEFFERSON COSTON, OF EUPORA, MISSISSIPPI.

HOE.

SPECIFICATION forming part of Letters Patent No. 775,701, dated November 22, 1904.

Application filed March 30, 1904. Serial No. 200,838. (No model.)

*To all whom it may concern:*

Be it known that I, JOHN JEFFERSON COSTON, a citizen of the United States, residing at Eupora, in the county of Webster, State of Mississippi, have invented certain new and useful Improvements in Hoes; and I do hereby declare the following to be a full, clear, and exact description of the invention, such as will enable others skilled in the art to which it appertains to make and use the same.

This invention relates to hoes, and has for its object to provide a hoe wherein there will be a supplemental blade so disposed as to facilitate the pushing or shoving of the grass or weeds that have been chopped up by the main blade of the hoe. In the use of the ordinary hoe the grass or weeds are pushed or shoved with the back or side of the blade, which is a rather difficult operation.

In the drawings forming a portion of this specification, and in which like numerals of reference indicate similar parts in the several views, Figure 1 is a longitudinal section taken vertically through a hoe with the cutting edge of the main blade in active position. Fig. 2 is a section similar to Fig. 1 with the supplemental blade in active position. Fig. 3 is a detail perspective view of the blades.

Referring now to the drawings, the present hoe comprises a main blade 5 and a supplemental blade 6, formed from a single rectangular sheet of metal, which is bent on a line 7 parallel with the cutting edge of the supplemental blade, so that the supplemental blade lies at an obtuse angle to the main blade. Through the main blade, adjacent to the line 7, is formed a perforation 8 midway between the ends of the blade, and through this perforation is passed the gooseneck 10, to which is connected the usual handle 11, said gooseneck fitting the perforation snugly. The end of the gooseneck within the angle between the main and supplemental blades is flattened and is secured against the front face of the main blade by a rivet 13, this flattened portion extending in the direction of the cutting edge of the main blade, the cutting edges of the main and supplemental blades being illustrated at 14 and 15, respectively.

Upon reference to Fig. 1 of the drawings, it will be seen that in the use of the hoe with its main blade the pressure of the gooseneck on the blade is in the direction of the cutting edge thereof and that as the gooseneck as it passes through the perforation in the blade lies at an obtuse angle to the blade the pressure of the gooseneck is in large part against the lower side of the perforation, so that very little strain is placed upon the rivet and a rigid structure results.

Upon reference to Fig. 2 of the drawings it will be seen that when the supplemental blade is in use the pressure of the gooseneck is in the direction of extension of the supplemental blade and against what is then the lower side of the perforation, so that very little strain is placed upon the rivet, the gooseneck at its point of passage through the main blade being at very nearly a right angle to the supplemental blade.

What is claimed is—

A hoe consisting of a metal plate having its opposite longitudinal edges sharpened to form cutting edges, said plate being bent on a line parallel with one cutting edge and adjacent thereto to form main and supplemental blades lying at an obtuse angle, the main blade having a perforation therethrough directly adjacent to the supplemental blade, a gooseneck passed through said perforation and riveted against the face of the main blade in the angle between the main and supplemental blade and a handle connected to the gooseneck at the opposite side of the main blade from the point of attachment of the gooseneck to said blade.

In testimony whereof I affix my signature in presence of two witnesses.

JOHN JEFFERSON COSTON.

Witnesses:
G. E. WHITE,
J. O. EUDY.